US008726698B2

(12) United States Patent
Nguyen et al.

(10) Patent No.: US 8,726,698 B2
(45) Date of Patent: May 20, 2014

(54) MANUFACTURING PROCESS FOR CHALCOGENIDE GLASSES

(75) Inventors: Vinh Q Nguyen, Fairfax, VA (US); Jasbinder S Sanghera, Ashburn, VA (US); Shyam S Bayya, Ashburn, VA (US); Geoff Chin, Arlington, VA (US); Ishwar D Aggarwal, Fairfax Station, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/483,023

(22) Filed: May 29, 2012

(65) Prior Publication Data

US 2012/0238432 A1 Sep. 20, 2012

Related U.S. Application Data

(62) Division of application No. 12/179,797, filed on Jul. 25, 2008, now abandoned.

(51) Int. Cl.
*C03B 37/012* (2006.01)
*C03B 37/075* (2006.01)
*C03B 5/173* (2006.01)

(52) U.S. Cl.
USPC ................ 65/390; 65/389; 423/263; 423/508

(58) Field of Classification Search
USPC .................................... 65/389, 390
See application file for complete search history.

(56) References Cited

U.S. PATENT DOCUMENTS

2005/0229636 A1* 10/2005 Nguyen et al. ................. 65/33.1

OTHER PUBLICATIONS

Shiryaev et al. ,"Recent Progress in Preparation of Chalcogenide As-Se-Te Glasses with Low Impurity Content", Journal of Optoelectronics and Advanced Materials, vol. 7, No. 4, Aug. 2005, p. 1773-1779.*
Abe et al., "Preparation and properties of Ge-Ga-S glasses for laser hosts", J. of Non-Crystalline Solids, 212, 1997, pp. 143-150.*
Shiryaev et al., "Infrared fibers based on Te-As-Se glass system with low optical loss", J. Non-Crystalline Solids, pp. 113-119 (2004).*

* cited by examiner

*Primary Examiner* — Matthew Daniels
*Assistant Examiner* — Lisa Herring
(74) *Attorney, Agent, or Firm* — US Naval Research Laboratory; Rebecca L. Forman

(57) ABSTRACT

The present invention is generally directed to a method of making chalcogenide glasses including holding the melt in a vertical furnace to promote homogenization and mixing; slow cooling the melt at less than 10° C. per minute; and sequentially quenching the melt from the top down in a controlled manner. Additionally, the present invention provides for the materials produced by such method. The present invention is also directed to a process for removing oxygen and hydrogen impurities from chalcogenide glass components using dynamic distillation.

1 Claim, 10 Drawing Sheets

(A)

(B)

(A)　　　　　　　　　　　　　　(B)

$T_g$ – glass transition temperature
$T_N$ – nucleation onset temperature
$T_{XH}$ – crystallization onset upon heating temperature
$T_{XC}$ – crystallization onset upon cooling temperature
$T_L$ – liquidus temperature on heating (above which all liquid)

(A)

(B)

(A) – COMPARATIVE EXAMPLE  (B)

MANUFACTURING PROCESS FOR CHALCOGENIDE GLASSES

PRIORITY CLAIM

The present application is a divisional application of U.S. application Ser. No. 12/179,797 filed on Jul. 25, 2008 now abandoned by Vinh Q. Nguyen et al., entitled "MANUFACTURING PROCESS FOR CHALCOGENIDE GLASSES," the entire contents of each are incorporated herein by reference.

BACKGROUND OF THE INVENTION

1. Field of the Invention

The present invention is generally directed to a method of making chalcogenide glasses, including rare-earth doped chalcogenide glasses, and the materials produced by such method.

2. Description of the Prior Art

To date, the typical way to melt a chalcogenide glass is to heat the elemental precursors in an evacuated and sealed quartz ampoule. The furnace is a rocking furnace which assists in mixing of the melt (FIG. 1). After several hours of rocking at elevated temperature, the furnace is placed at an angle of about 45 degrees and the ampoule containing the melt is pulled out, held vertical for several seconds (FIG. 2), then immersed in water to quench the melt. The problem is that when the ampoule is set from a 45 degree angle to a 90 degree angle, the top of the glass melt near the meniscus undergoes turbulent viscous flow. The glass melt surface area of the 45 degree angle $(SA)_{45}$ is estimated to be more than 3 times that of the glass melt surface area of the 90 degree angle $(SA)_{90}$ (FIGS. 2A and 2B). When the ampoule is quenched in water, that unstable and viscous state near the top of the glass melt is frozen in place. This leads to the typical refractive index perturbations observed in these glasses. In addition, the melts may interact with the quartz ampoule.

During quenching, the heat loss conduction mechanism also gives rise to a large meniscus (FIG. 3). FIG. 3A shows the meniscus of the glass melt at 400° C. just before quenching in water. FIG. 3B shows the formation of the meniscus during the quenching in water. When the ampoule is submerged in water, the glass melt along the inner wall of the ampoule freezes, including the bottom region of the ampoule. Heat is transferred from a higher temperature glass melt center region through the ampoule/glass melt interface and into the water. Formation of the meniscus continues as the temperature drops due to shrinking of the glass melt via heat conduction loss mechanism through the ampoule/glass melt interface. This conventional quenching process leads to a large meniscus and, therefore, lower yield of useable glass. From a commercial perspective, this increases the cost of the glass.

During submersion in water, the melt quenches rapidly and leads to rapid pull away of the glass all at once from the quartz, leading to a powerful shock wave which causes cracking of the chalcogenide glass. This can be manifested as micro-cracking in the glass or can sometimes lead to catastrophic failure of the glass. This problem has prevented the fabrication of rare-earth doped chalcogenide glass fiber lasers.

Further, metal oxides and hydrides have strong absorption bands in the infrared wavelength region, which tend to lower the phonon energy of the glass thereby reducing radiative lifetimes of rare earth ions. Therefore, oxygen and hydrogen impurities will affect the glass quality.

The conventional method to make chalcogenide glasses, including rare-earth doped chalcogenide glasses uses a high temperature quenching process that results in a large meniscus, which yields a small volume of useable glass. Moreover, there are refractive index perturbations in the glass that limit the quality of the glass and fiber made from this glass. Optical fibers made from these glasses will cost more because the glass yield is low, and refractive index perturbations will limit their optical performance.

BRIEF SUMMARY OF THE INVENTION

The aforementioned problems are overcome in the present invention which provides a process for preparing chalcogenide glasses including heating the glass components to a melt temperature to form a melt, holding the melt in a vertical furnace to promote homogenization and mixing, slow cooling the melt at less than 10° C. per minute, and sequentially quenching the melt from the top down in a controlled manner. The present invention also provides for the materials produced by such process. The present invention is further directed to a process for removing oxygen and hydrogen impurities from chalcogenide glass components using dynamic distillation.

In one embodiment, the chalcogenide glass is a stable glass, such as arsenic sulfide or arsenic selenide. In a further preferred embodiment, the stable glass is cooled within 50° C. of the glass transition temperature before quenching.

In another embodiment, the chalcogenide glass is an unstable glass, such as a rare earth doped chalcogenide glass. In a further preferred embodiment, the rare earth doped chalcogenide glass comprises germanium, arsenic, gallium, and selenium; and the rare earth metal is praseodymium. In an even more preferred embodiment, the rare earth doped chalcogenide glass is cooled to within 50° C. of the glass crystallization upon cooling temperature and below the liquidus temperature before quenching.

Another embodiment of the present invention is generally directed to a process for removing oxygen impurities from chalcogenide glass components, including providing a two-zone furnace having a first temperature zone and a second temperature zone; providing a first chamber disposed in the first temperature zone and a second chamber in the second temperature zone, wherein the first chamber is fluidly connected to the second chamber such that vapors will transfer from the first chamber to the second chamber; providing chalcogenide glass components in the first chamber in the presence of aluminum, zirconium, magnesium, or any combination thereof; and heating the first chamber to a temperature greater than the second chamber, such that purified chalcogenide glass components distill into the second chamber leaving any oxygen impurities in the first chamber.

Another embodiment of the present invention is generally directed to a process for removing hydrogen impurities from chalcogenide glass components including providing a first chamber disposed in a furnace, wherein the first chamber is fluidly connected to a vacuum; providing chalcogenide glass components in the first chamber in the presence of tellurium tetrachloride; and heating the first chamber to a temperature to vaporize an HCl species from the chalcogenide glass components and withdrawing the HCl species from the first chamber via the vacuum. This embodiment may also include providing a second chamber disposed outside of the furnace fluidly connected to the first chamber such that vapor will transfer from the first chamber to the second chamber and distilling the chalcogenide glass components from the first chamber to the second chamber to form a rare-earth doped chalcogenide glass.

The chalcogenide glasses of the present invention offer many benefits in at least some embodiments of the invention. Slow cooling the glass melts minimizes stresses during quenching. Moreover, controlled slow cooling may enable thermal equilibrium and steady state to occur in the glass melt. This contributes to a lower energy and stable state of the glass melt just before quenching. This also results in a small meniscus and, therefore, higher yield. The yield of useable glass is typically greater than 80%, compared with typically less than 60% for the conventional method. Additionally, vertical homogenization of the melt may eliminate or reduce the refractive index perturbations. The glass potentially can be used to make high optical quality fiber at potentially reduced cost, and fibers made using the glass of the present invention may be less susceptible to refractive index perturbations. Therefore, cost may be reduced and fibers made from the glasses of the present invention may have better optical properties. Moreover, these glasses will potentially enable the manufacture of fiber lasers in the infrared.

The high quality glasses of the present invention may produce high optical quality chalcogenide fibers. Chalcogenide glass transmits from between about 1 μm to about 12 μm, depending on composition. The infrared transmitting chalcogenide glasses and optical fibers encompass the IR region of interest with numerous applications including thermal imaging, temperature monitoring, and medical applications. Also, the chalcogenide glass fibers may be developed for IR missile warning systems and laser threat warning systems to provide superior aircraft survivability, and high energy IR power delivery using for example, but not limited to, CO (5.4 μm) and $CO_2$ (10.6 μm) lasers. In addition, these fibers may be developed for remote fiber optic chemical sensor systems for military facility clean up and other industrial applications.

The arsenic sulfide and arsenic selenide fibers described herein may be developed for use in many defense applications including high energy IR laser power delivery for infrared countermeasures and defense facility clean up. High quality infrared transmitting optical fibers enable application in remote chemical sensors to detect contaminants in groundwater, environmental pollution monitoring, other civil/industrial process monitoring applications as well as Raman amplifiers and all optical ultra-fast switches for telecommunications, and fiber sources in the infrared for sensors. In addition, IR fibers are needed for biomedical surgery and tissue diagnostics.

Rare-earth doped chalcogenide glasses and fibers have great advantages over rare-earth doped silica and rare-earth doped heavy-metal fluoride glass fibers because of further infrared transmission (1-10 μm) and the rare-earth doped chalcogenide glasses possess lower phonon energies and consequently, reduced multiphonon quenching. This property may enable more efficient fluorescence in the infrared as well as emission wavelengths that are not possible in rare-earth doped silica fibers. Rare-earth doped chalcogenide glass fibers could find widespread use as infrared laser sources for chemical sensors systems and biomedical surgery/cauterization, as well as improved optical amplifiers for telecommunications.

These and other features and advantages of the invention, as well as the invention itself, will become better understood by reference to the following detailed description, appended claims, and accompanying drawings.

DETAILED DESCRIPTION OF THE INVENTION

The present invention generally relates to a new process to increase the useable yield of stable and unstable chalcogenide glasses, including rare-earth doped chalcogenide glasses. The present invention includes a chalcogenide glass product having a reduced meniscus, which may reduce or eliminate refractive index perturbations. The present invention also includes procedures for removing oxygen and hydrogen impurities from chalcogenide glasses.

Figure 4:
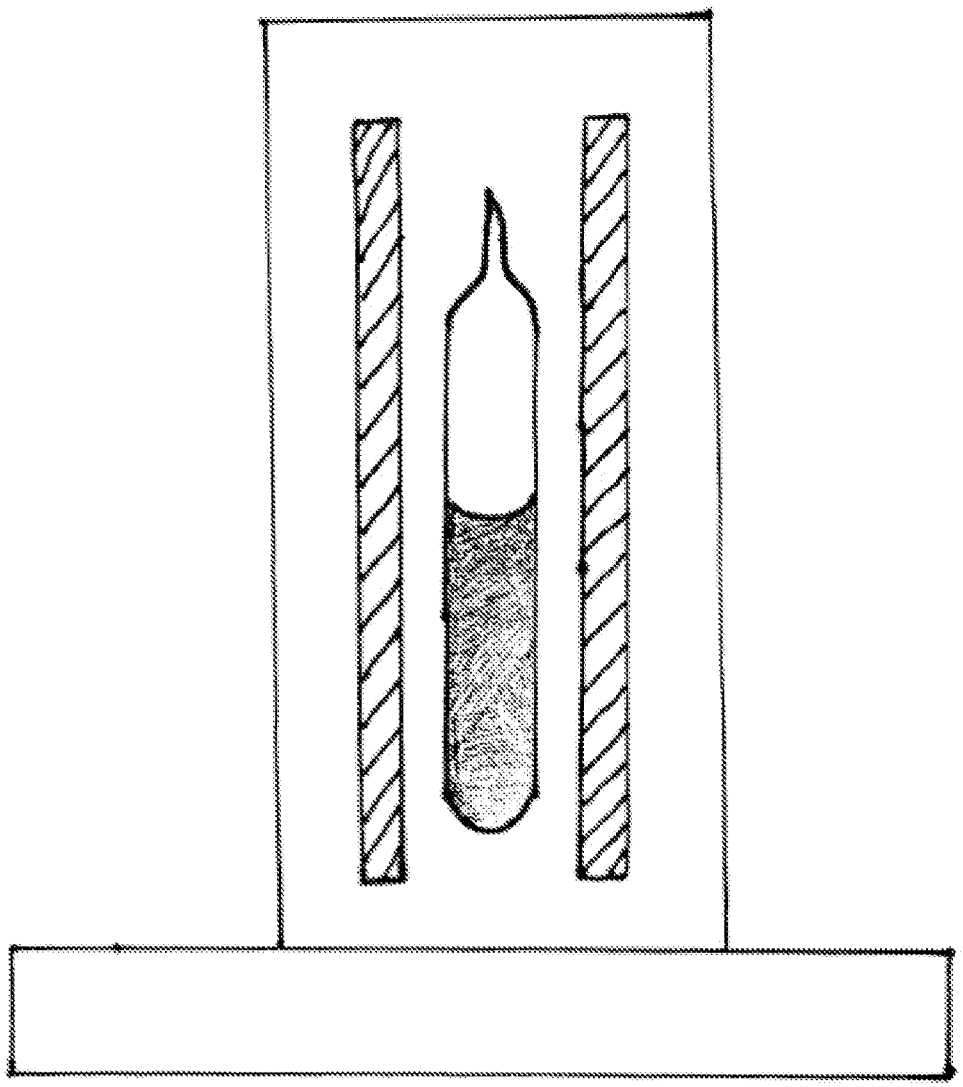
FIG. 4 is a schematic diagram of an example of a quartz ampoule containing a glass melt inside a furnace with a 90 degree inclination angle (i.e. vertical), in accordance with the present invention.

In one embodiment of the present invention, the components for a chalcogenide glass are heated to form a melt inside a quartz ampoule. The heating takes place inside a rocking furnace to facilitate mixing of the melt. The melt can stay in the rocking furnace for several hours. Then, the ampoule is pulled out of the rocking furnace at elevated temperatures while the melt is still fluid. As shown in FIG. 4, the melt is then held vertical and placed in a vertical furnace for up to several hours to allow mixing and homogenization of the top surface (turbulent material) on going from a 45 degree angle to the vertical position.

Next, the melt is slow cooled. To slow cool the melt, the temperature is reduced by less than 10° C. per minute, and more preferably by less than 5° C. per minute. Controlled slow cooling enables thermal equilibrium and steady state to occur in the glass melt at all time. This contributes to a lower energy and stable state of the glass melt just before quenching. This also results in a small meniscus and therefore higher yield in useable glass. Vertical homogenization of the melt reduces or eliminates the refractive index perturbations. Fibers made using glass prepared in this manner should have reduced refractive index perturbations.

Figure 5:
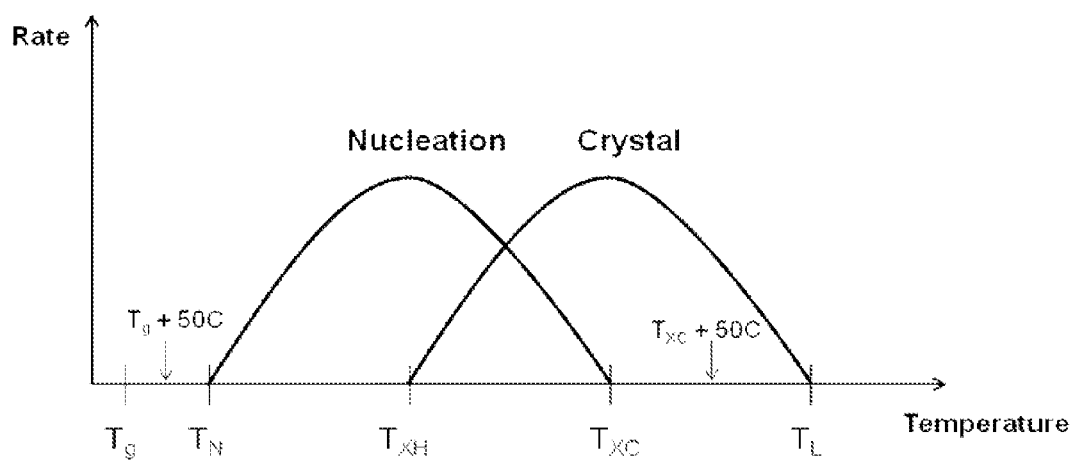
FIG. 5 is a nucleation and crystal growth rate curve for chalcogenide glasses.

Determining how much to cool the melt depends on whether the glass is stable or unstable and on the applicable Nucleation and Crystal Growth Rate Curve (e.g., FIG. 5). Crystallization in the melt should be avoided because it leads to a poor quality glass which will scatter light more strongly. Further, the crystallization of rare-earth doped chalcogenide glasses leads to rare-earth ion clustering which impedes the rare-earth ion emission.

As shown in FIG. 5, there is no nuclei or crystal growth at the glass transition temperature ($T_G$). Upon heating, small nuclei begin to form at the nucleation onset temperature ($T_N$). At the crystallization onset upon heating temperature ($T_{XH}$), crystals begin to grow on these nuclei. Above the liquidus temperature on heating ($T_L$), all the crystals melt to form a liquid. Upon cooling below $T_L$, no crystals can form until the temperature is at or below the crystallization onset upon cooling temperature ($T_{XC}$). Below $T_{XC}$, the nuclei form and crystals grow, especially between $T_{XC}$ and $T_{XH}$.

Stable chalcogenide glasses, such as arsenic selenide and arsenic sulfide, do not crystallize easily when quenched slowly from elevated temperatures to their glass transition temperatures. Therefore, these stable glasses are slowly cooled to within 50° C. above $T_G$ (i.e., between $T_G$ and $T_G+50°$ C.) before quenching since nuclei and crystal growth are absent. More typically, they are cooled to within 30° C. above $T_G$.

For unstable chalcogenide glasses, including rare-earth doped chalcogenide glasses, the glass melt should be cooled to within 50° above $T_{XC}$ (i.e., between $T_{XC}$ and $T_{XC}+50°$ C.) but below $T_L$ before quenching to prevent crystal formation. The various temperatures (e.g. $T_G$, $T_{XH}$, $T_{XC}$, and $T_L$) will vary somewhat from one glass system to another. Table 1 shows an example of the various temperatures for two unstable glasses (a rare-earth doped core and an undoped clad). Both glasses were cooled to 650° C. before quenching, which was 25° C. above $T_{XC}$ and below $T_L$.

TABLE 1

Various temperatures for two unstable chalcogenide glasses.

| Glass | $T_{quench}$ (° C.) | $T_G$ (° C.) | $T_{XH}$ (° C.) | $T_{XC}$ (° C.) | $T_L$ (° C.) |
|---|---|---|---|---|---|
| RE doped core | 650 | 265 | 575 | 625 | 725 |
| Clad | 650 | 265 | 575 | 625 | 725 |

Once cooled to the temperature described above, the glass is quenched in a controlled manner to cool from the top surface down. This enables the glass to quench sequentially and prevents a shock wave from forming. Also, lowering the temperature before quenching minimizes stresses during quenching. The glass can be quenched using air flow (or other gas e.g. Ar, $N_2$, etc) or using liquid, e.g., water.

Figure 6:
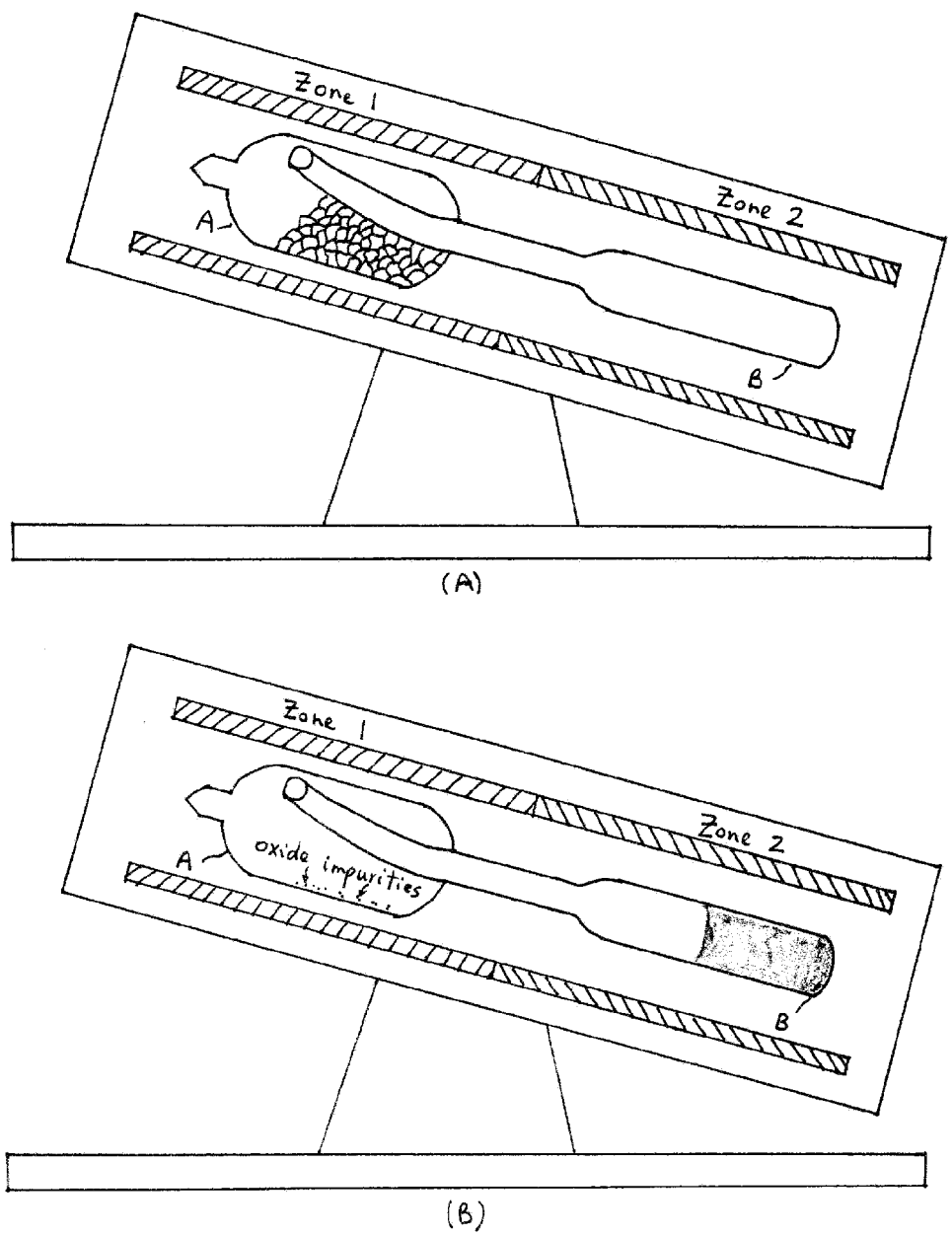
FIG. 6 is a schematic representation of an oxide removal process including (A) forming of oxide with the presence of aluminum at high temperature and (B) removing oxide through distillation.
Figure 7:
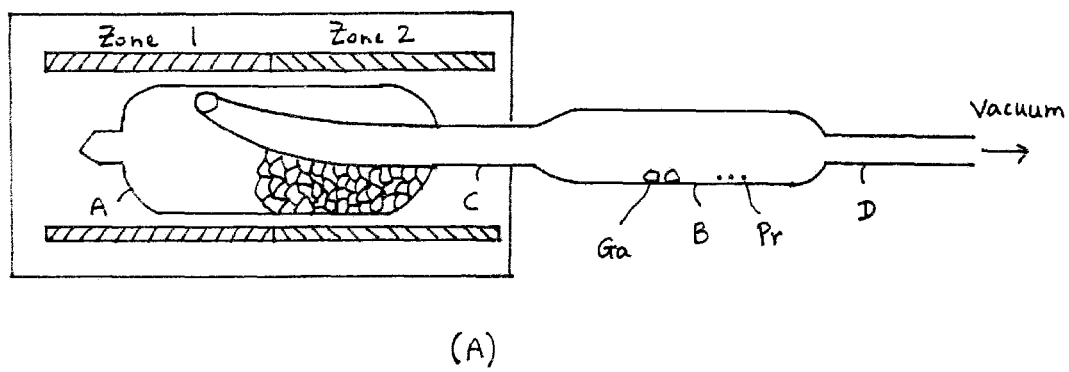
FIG. 7 is a schematic representation of a hydrogen impurities removal process using dynamic distillation including (A) removal of the HCl gas species and (B) Ge—As—Se glass distillation with Pr doping.
Figure 7:
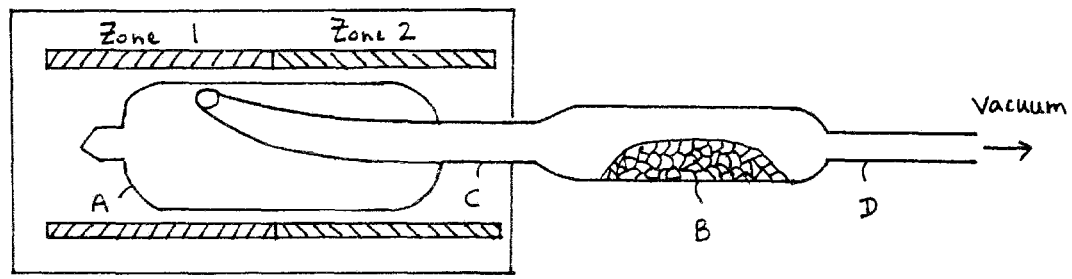

The present invention also includes a method of removing oxygen and hydrogen impurities from doped and undoped chalcogenide glasses. Oxygen and hydrogen impurities in the glass should be removed since the metal oxides have strong absorption bands in the infrared wavelength region, which tend to lower the phonon energy of the glass thereby reducing radiative lifetimes of the rare earth ions. Oxygen removal is accomplished using two connected chambers in a two-zone (or two-temperature) furnace (FIG. 6) to facilitate distillation of glass precursors in the presence of addition of aluminum. The glass distills from chamber A in the first zone to chamber B in the second zone leaving oxide impurities in chamber A. In a subsequent distillation process, hydrogen impurities can be removed by dynamic distillation in the presence of tellurium tetrachloride ($TeCl_4$). (See, e.g., FIG. 7.) In particular, the presence of $TeCl_4$ in the glass melt enables the formation of hydrogen chloride (HCl) at 700° C., which is dynamically removed from the chamber. Using a two zone furnace, this second distillation process can also be used to dope the glass with the rare-earth elements, for example, praseodymium (Pr) as shown in FIG. 7.

This invention can also be applied to other chalcogenide glass systems such as multicomponent As—S containing glasses as well as As—Se containing glasses such as arsenic selenide (As—Se) and telluride based glasses (Ge—As—Se—Te). In addition, this invention can be used to quench any chalcogenide glass melt doped with rare earth elements or even other melts which tend to typically crystallize on regular cooling.

EXAMPLE 1

Example of Material Involving Stable Chalcogenide Glasses

Figure 8:
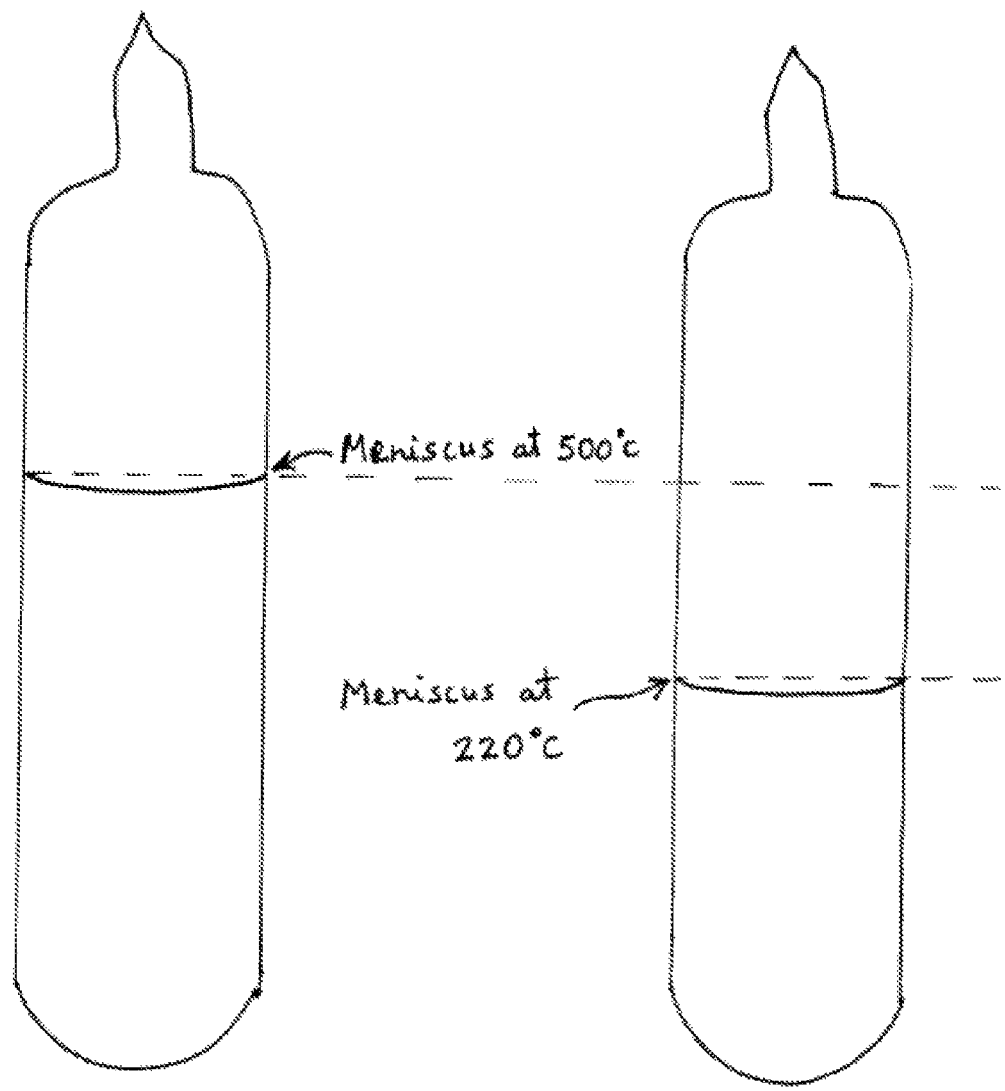
FIG. 8 is a schematic diagram of the meniscus of the arsenic sulfide glass melt at (A) 500° C. and (B) 220° C.

First, 47.92 grams of arsenic and 32.08 grams of sulfur precursors (a total of 80 grams) were batched in a silica ampoule with a composition of $As_{39}S_{61}$. The ampoule was evacuated for 4 hours at $1\times10^{-5}$ Torr. The ampoule was sealed using a methane/oxygen torch. Inside a rocking furnace with a 45 degree angle inclination, the ampoule containing the arsenic and sulfur precursors was melted at 450° C. for 4 hours. For homogenization mixing and uniform glass melting, the temperature was increased to 600° C. for 4 hours and 800° C. for 10 hours. Next, the rocking furnace was set at a 45 degree inclination and the temperature was lowered to 700° C. for 1 hour. The ampoule was transferred from the 45 degree furnace into another vertically 90° furnace with the temperature set at 700° C. (FIG. 4). The temperature of the vertical furnace was set at 700° C. for 1 hour for homogenization and uniform mixing. Next, the temperature of the vertical furnace was decreased slowly from 700° C. to 500° C. at 1° C./min, and held at 500° C. for 1 hour. Then the temperature of the vertical furnace was decreased from 500° C. to 220° C. at 1° C./min and held at 220° C. for 30 minutes, which is 20° C. above $T_G$. This controlled slow cooling lowered the energy state of the arsenic sulfide glass melt and enabled the formation of stable As—S glass resulting in a very small meniscus as seen in FIG. 8.

Next, the ampoule was raised above the vertical furnace and air quenched using the copper circular ring assembly (FIG. 9) in a controlled manner as described below. The ampoule is pulled through the copper circular ring assembly to provide symmetrical cooling conditions on all sides of the ampoule. The top of the glass melt near the meniscus was quenched first. In this embodiment, 60 psi of room temperature air was circulated through the copper circular ring assembly. The pressure could be higher or lower depending on the configuration of the system as well as the mass and volume of the glass. When the top of the glass melt had quenched and pulled away from the ampoule, the ampoule was slowly raised and subsequent portions of the ampoule were air quenched sequentially until all sections of the glass rod completely quenched and pulled away from the ampoule. The arsenic-sulfide ampoule was then put inside an annealer with a set point at 180° C. and was annealed at 180° C. for 6 hours and slowly cooled from 180° C. to room temperature at 1° C./min.

FIGS. 8A and 8B show the schematic diagram of the controlled slow cool for the arsenic sulfide glass melt at 500° C. and 220° C., respectively. Since the glass melt was being cooled very slowly, the temperature at any point inside the glass melt always reached equilibrium state, i.e., there is no temperature gradient between the center of the glass melt and the outer region next to the ampoule inside wall. This results in small meniscus as shown in FIG. 8B.

Photographs of the one inch arsenic sulfide glass rods quenched using the process of the present invention and the conventional rapid quench process show that the meniscus length in a comparative example glass rod obtained from a conventional process is about 10 times larger than that of a glass rod using the slow cool process of the present invention. In fact, the useable glass is now greater than 80% of the total volume compared with only about 60% using conventional quenching methods.

In a similar manner, 70.656 grams of arsenic and 49.344 grams of sulfur were used to make a 120 grams 1-in diameter glass cullet of clad composition $As_{38}S_{62}$ suitable for the $As_{39}S_{61}$ core composition.

The arsenic sulfide glass cullets with a nominal core ($As_{39}S_{61}$) and clad ($As_{38}S_{62}$) compositions were drawn into optical fiber using a controlled double crucible process. The fibers were drawn under inert atmosphere at a rate of approximately 5.0 meters per minute. The fibers were free from reactive index perturbations when examined using optical microscopy.

EXAMPLE 2

Example of Material Involving Rare-earth Doped Chalcogenide Glasses

Oxide impurities present in the starting components (germanium, arsenic, and selenium) were removed by melting the precursors with the addition of 10 ppm of aluminum, zirconium, magnesium, or any combination thereof. First, 14.905 grams of germanium, 13.631 grams of arsenic, 51.102 grams of selenium, and 0.008 grams of aluminum precursors (approximately 79.646 grams) were batched in a silica ampoule in chamber A (FIG. 6). Table 2 shows the typical batch size to make about 80 grams of core cullet. The ampoule was evacuated for 4 hours at $1 \times 10^{-5}$ Torr. The ampoule was sealed using a methane/oxygen torch.

TABLE 2

Batch calculations for making ~80 grams of core cullet rare-earth doped glass rod with $Ge_{19.75}As_{17.5}Ga_{0.5}Se_{62.25}$ composition

|    | Mol % | Mol. Wt. | 80 g batch |
|----|-------|----------|------------|
| Ge | 19.750 | 72.59 | 14.905 |
| As | 17.500 | 74.922 | 13.631 |
| Ga | 0.500 | 69.72 | 0.362 |
| Se | 62.250 | 78.96 | 51.102 |
|    | 100.000 |      | ~80.000 |

The ampoule (chamber A) was placed in the first zone of a two-zone furnace for the glass melting, homogenization, and distillation processes. Within the furnace, chamber A is fluidly connected to chamber B, which is placed in the second zone of the two-zone furnace, as illustrated in FIG. 6. The two-zone furnace is set at a 45 degree angle. The glass melting schedules are given in Step-1 in Table 3. When all the glass melt was distilled over into chamber B during Soak Time 3 in Step-1 from Table 3, chamber B is pulled out of the furnace and quenched in water. Oxide impurities remain in chamber A.

TABLE 3

Glass melting schedules used in making 80 grams of core cullet rare-earth doped glass rod with $Ge_{19.75}As_{17.5}Ga_{0.5}Se_{62.25}$ composition

|  | Step-1 | | Step-2 | Step-3 | Step-4 |
|---|---|---|---|---|---|
|  | Zone 1 | Zone 2 | Zone 1 & 2 | Zone 1 & 2 | Zone 1 & 2 |
| Ramp 1 (° C./min) | 5 | 5 | 5 | 5 | 5 |
| Soak Temp 1 (° C.) | 500 | 550 | 850 | 280 | 500 |
| Soak Time 1 (hrs.) | 1 | 1 | 12 | 4 | 1 |
| Ramp 2 (° C./min) | 5 | 5 | 10 | 2 | 5 |
| Soak Temp 2 (° C.) | 850 | 900 | 700 | 400 | 850 |
| Soak Time 2 (hrs.) | 12 | 12 | 3 | 4 | 2 |
| Ramp 3 (° C./min) | 5 | 5 |  | 2 | 5 |
| Soak Temp 3 (° C.) | 900 | 400 |  | 500 | 950 |
| Soak Time 3 (hrs.) | 12 | 4-12 |  | 4 | 1 |
| Ramp 4 (° C./min) |  |  |  | 2 | 5 |
| Soak Temp 4 (° C.) |  |  |  | 625 | 850 |
| Soak Time 4 (hrs.) |  |  |  | 4-12 | 15 |
| Ramp 5 (° C./min) |  |  |  |  | 5 |
| Soak Temp 5 (° C.) |  |  |  |  | 750 |
| Soak Time 5 |  |  |  |  | 3 |

After the ampoule was quenched from Step-1 of Table 3, chamber B was broken near the top and 0.014 g of $TeCl_4$ added. The ampoule containing the distilled glass and $TeCl_4$ was evacuated for 4 hours at $1 \times 10^{-5}$ Torr. The ampoule was sealed using a methane/oxygen torch. The ampoule was placed in a two-zone rocking furnace (FIG. 1) and was melted and homogenized using the schedule in Step-2 of Table 3. This melting was performed with the furnace rocking to mix and homogenize the glass. The glass at the end of Soak Time 2 in Step-2 was quenched at 700° C. in water and saved as a core cullet. The presence of $TeCl_4$ in the glass melt enabled the formation of HCl species at 700° C. The tellurium is soluble in the glass.

From Step-2, 14.918 grams of the core cullet was loaded into another ampoule, i.e., chamber A in FIG. 7. In order that the glass is rare-earth doped, approximately, 0.068 grams of gallium and 0.014 grams of praseodymium were loaded into chamber B of the ampoule as shown in FIG. 7. The composite is described in Table 4. Chamber A of the ampoule was placed inside the two-zone furnace while chamber B was placed outside the furnace and hooked to a vacuum system. The furnace was turned on with the heating schedule of Step-3 in Table 3. As discussed above, the presence of TeCl$_4$ in the glass melt enabled the formation of HCl species. From Step-3 in Table 3, as the furnace was heated up from Soak Temperature 1 of 280° C. to Soak Temperature 4 of 625° C. the HCl gas species was dynamically removed by the vacuum before the distillation of the glass melt took place (FIG. 7A). At Soak Temperature 4 of 625° C. in Step-3, the glass melt was dynamically distilled from chamber A into chamber B. The furnace was turned off and chamber A of the ampoule was removed by sealing off using a methane/oxygen torch at section C. Next, chamber B was sealed at section D.

TABLE 4

Batch calculations for making 15 grams of core cullet rare-earth doped glass rod with $Ge_{19.75}As_{17.5}Ga_{0.5}Se_{62.25}$ composition

|  | 15 g Batch |
|---|---|
| Cullet | 14.918 |
| Ga | 0.068 |
| Pr | 0.014 |
|  | 15.000 |

Figure 1:
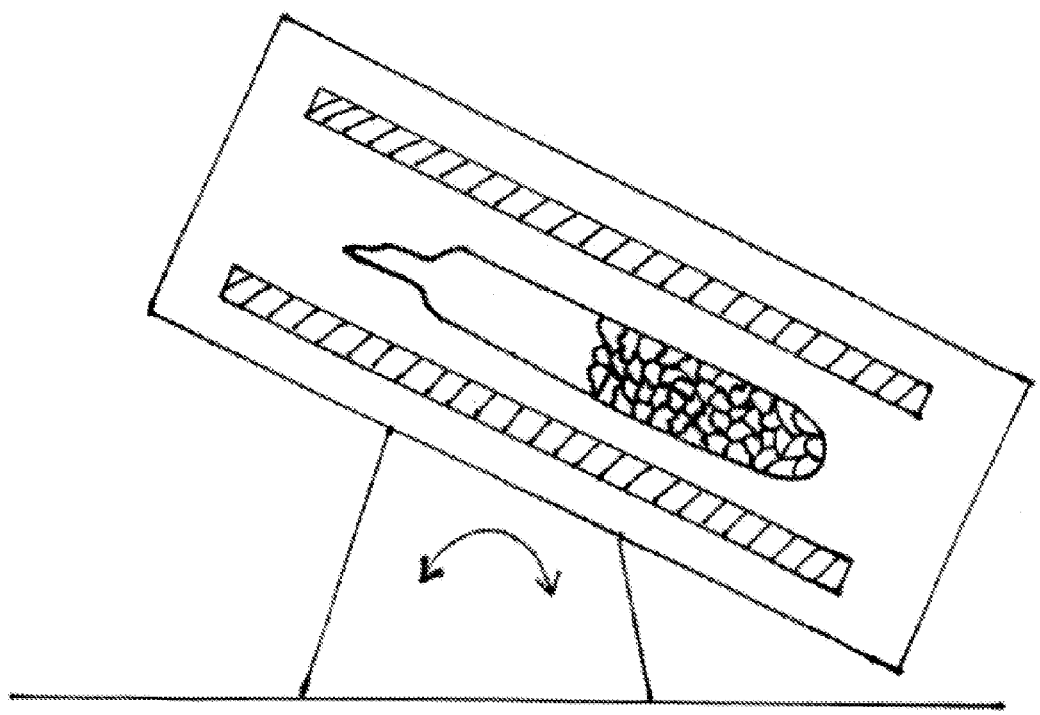
FIG. 1 is a schematic drawing of an example of a quartz ampoule containing arsenic sulfide (As—S) glass melt inside a rocking furnace with a 45 degree inclination angle.
Figure 2:
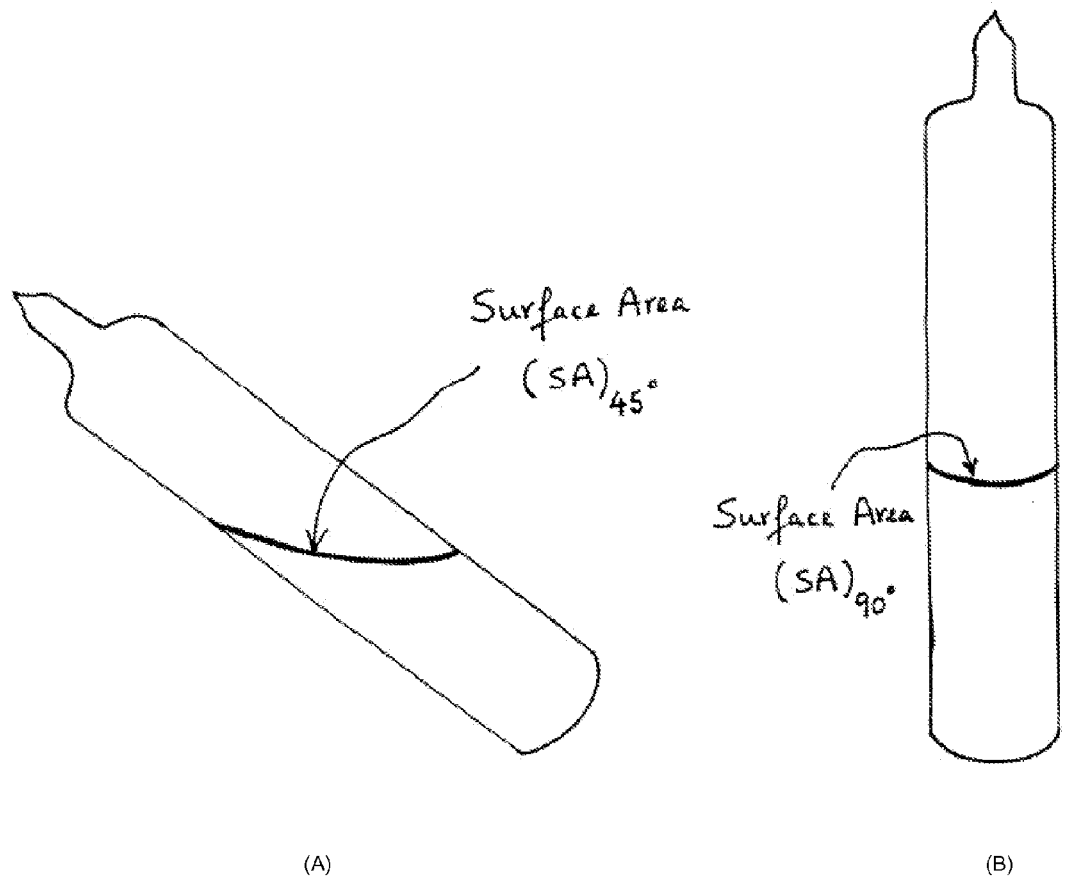
FIG. 2 is a schematic drawing of an example of a quartz ampoule containing arsenic sulfide glass melt set at a 90 degree angle from the 45 degree angle before quenching. The top volume of the glass melt near the meniscus undergoes turbulent viscous flow due to the shift from a surface area when the ampoule is at a 45 degree angle (A) to a reduced surface area when the ampoule is set at a 90 degree angle (B).
Figure 3:
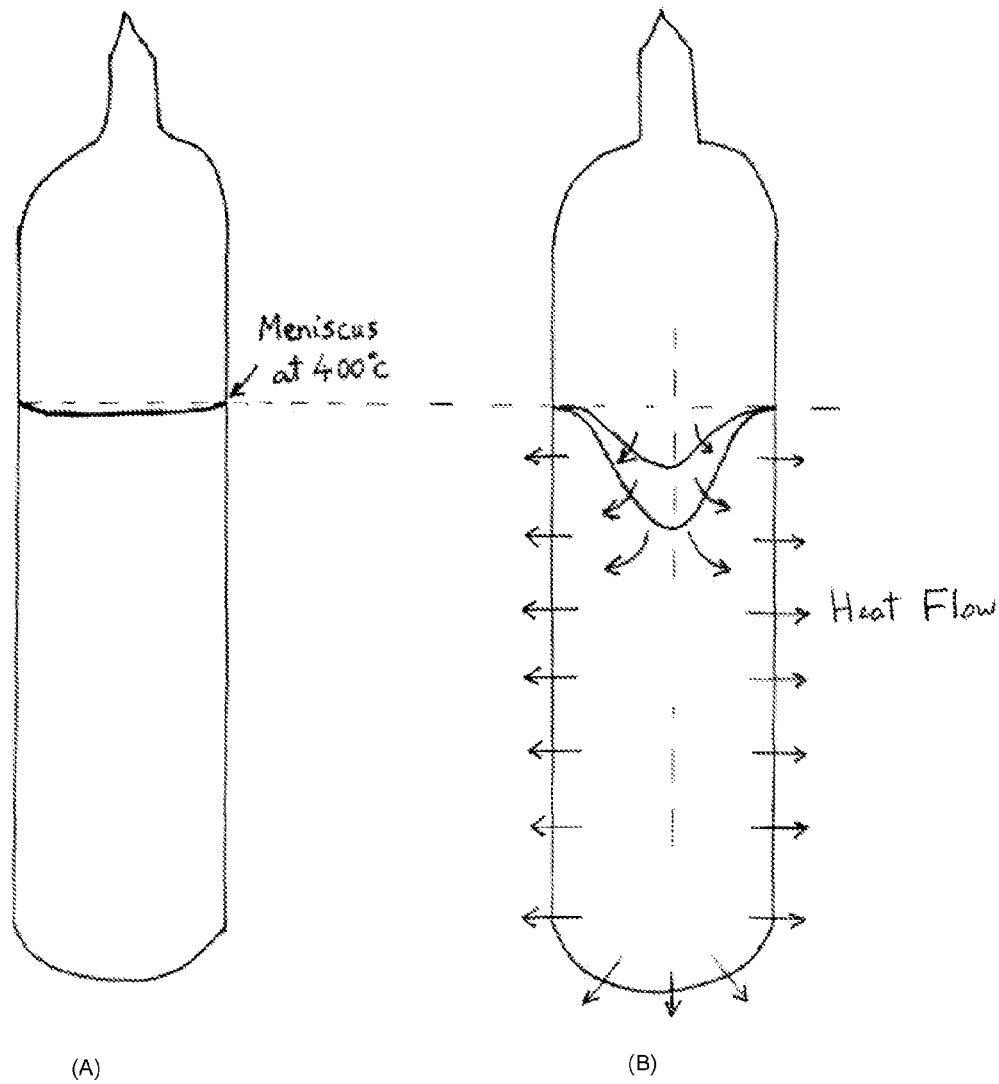
FIG. 3 is a schematic diagram showing (A) a glass melt meniscus at 400° C. before quenching in room temperature water and (B) the formation of meniscus via heat conduction loss at glass melt/ampoule interface and shrinkage of glass melt in accordance with a conventional quenching process.
Figure 9:
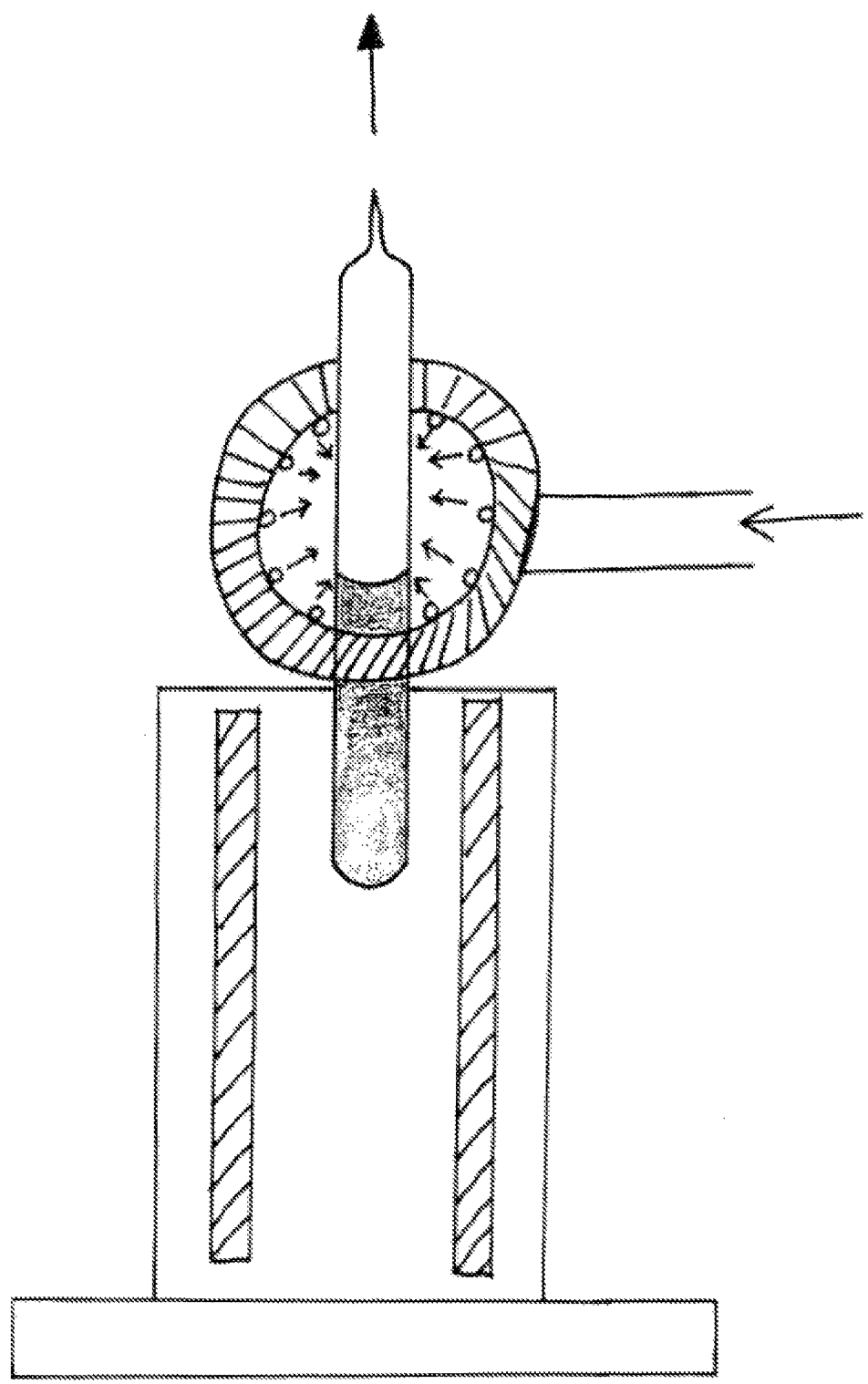
FIG. 9 is a schematic drawing of an air quenching process of one embodiment of the present invention.

The ampoule containing the oxygen- and hydrogen-free glass cullet, gallium, and praseodymium was put inside a two-zone rocking furnace (FIG. 1). The glass melting and homogenization furnace schedule is shown in Step-4 of Table 3. At the end of the melting cycle Soak Time 5 of 750° C., the rocking furnace was stopped and the glass ampoule was transferred into the vertical 90 degree furnace preheated to 750° C. (FIG. 9). Table 5 shows the glass melting schedules used in making 15 grams of core cullet rare-earth Pr doped glass rod with $Ge_{19.75}As_{17.5}Ga_{0.5}Se_{62.25}$ composition in the vertical furnace.

TABLE 5

Glass melting schedules in the vertical furnace used in making 15 grams of core cullet rare-earth Pr doped glass rod with $Ge_{19.75}As_{17.5}Ga_{0.5}Se_{62.25}$ composition.

|  | Step-5 |
|---|---|
| Ramp 1 (° C./min) | 5 |
| Soak Temp 1 (° C.) | 750 |
| Soak Time 1 (hrs.) | 3 |
| Ramp 2 (° C./min) | 5 |
| Soak Temp 2 (° C.) | 850 |
| Soak Time 2 (hrs.) | 1 |
| Ramp 3 (° C./min) | 3 |
| Soak Temp 3 (° C.) | 650 |
| Soak Time 3 (hrs.) | 2 |

The temperature of the vertical furnace was set at 850° C. for 1 hour for homogenization and uniform mixing (Step -5 in Table 5). Next, the temperature of the vertical furnace was decreased slowly from 850° C. to 650° C. at 3° C./min, and held at 650° C. for 2 hour for equilibrium to occur. The liquidus temperature of this glass is estimated to be about 725° C. Therefore, it was at least 50° C. below the liquidus temperature and at least 50° C. above $T_{xc}$ before quenching. Next, the ampoule was raised above the vertical furnace and air quenched using the copper circular ring assembly (FIG. 6). The top of the glass melt near the meniscus was quenched first using 60 psi of room temperature air. When the top of the glass melt has quenched and pulled away from the ampoule, the ampoule was slowly raised and air quenched sequentially until all sections of the glass rod completely quenched away from the ampoule. The rare-earth Pr doped Ge—As—Ga—Se glass ampoule was then put inside an annealer with a set point at 300° C. and was annealed at 300° C. for 4 hours and slowly cooled from 300° C. to room temperature at 1° C./min.

Figure 10:
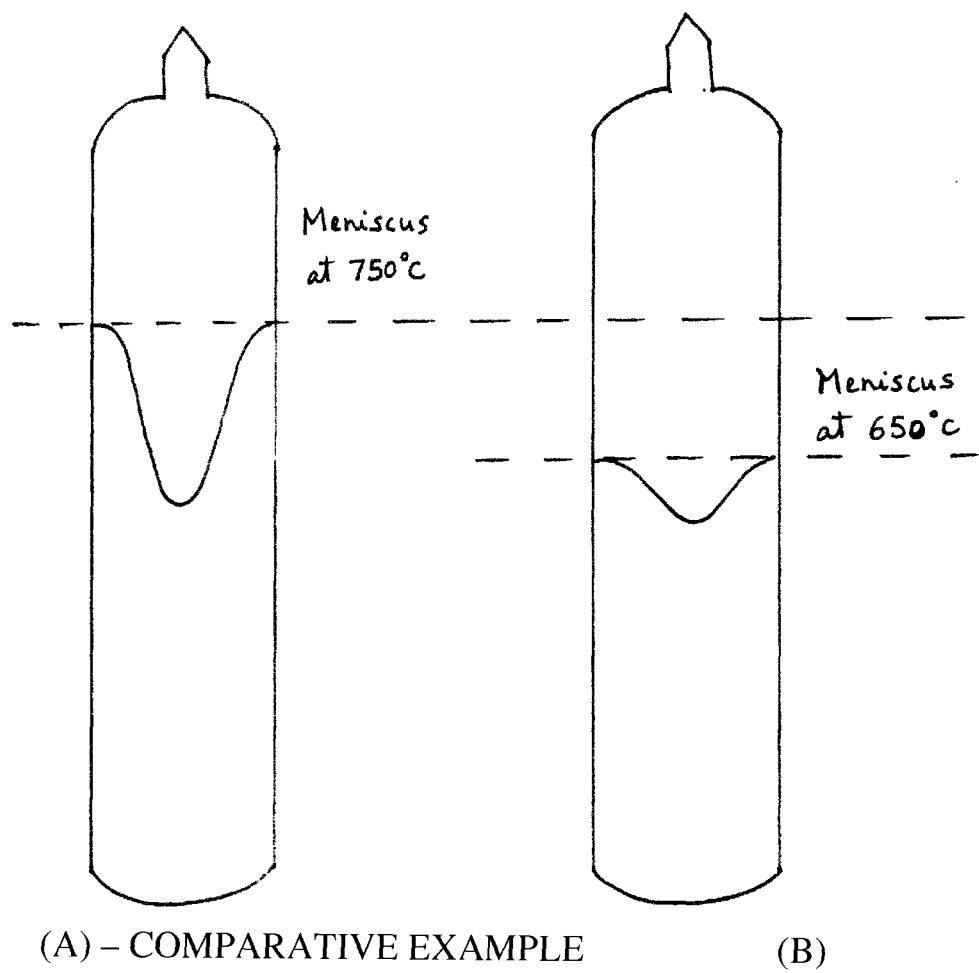
FIG. 10 is a schematic diagram of the meniscus of the rare earth Pr-doped (Ge—As—Ga—Se) glass melt at (A) 750° C. and (B) 650° C.

FIGS. 10(A) and (B) show the schematic diagram of the meniscus of the rare-earth Pr doped Ge—As—Ga—Se glass melt at 750° C. and 650° C., respectively. Since the glass melt was being cooled slowly to 650° C., the temperature at any point inside the glass melt always reached equilibrium state, i.e., there was no temperature gradient between the center of the glass melt and the outer region next to the ampoule inside wall. In addition, the glass melt at 650° C. has a lower energy state than that at 750° C. This process results in no refractive index perturbations in the glass and a smaller meniscus is observed as shown in FIG. 10B. Notice that the meniscus length in the glass rod obtained from a conventional process (FIG. 10A) is about 4 times larger than that of the glass rod using the process of the present invention (FIG. 10B). In fact, the useable glass is now greater than 80% of the total volume compared with only about 60% using conventional techniques.

EXAMPLE 3

Example of Material Involving Unstable Undoped Chalcogenide Glasses

Optical fiber cladding material for unstable rare-earth doped chalcogenide glasses are often made using unstable undoped chalcogenide glasses. The unstable glasses require a similar technique for purification and cooling. The oxide removal process is similar to the oxide removal step used for making the rare-earth doped core material discussed in Example 2 above. The oxide impurities present in the starting components (germanium, arsenic and selenium) are removed by melting the precursors with the addition of 10 ppm of aluminum. First, 14.935 grams of germanium, 14.230 grams of arsenic, 49.989 grams of selenium, and 0.008 grams of aluminum precursors (approximately 79.162 grams) were batched in a silica ampoule. Table 6 shows the typical batch size to make a 79.162 gram clad cullet. The ampoule was evacuated for 4 hours at $1 \times 10^{-5}$ Torr. The ampoule was sealed using a methane/oxygen torch.

TABLE 6

Batch calculations for making ~80 grams of clad cullet with $Ge_{19.5}As_{18}S_{2.5}Se_{60}$ composition

|  | Mol % | Mol. Wt. | 80 g batch |
|---|---|---|---|
| Ge | 19.50 | 72.59 | 14.936 |
| As | 18.00 | 74.922 | 14.230 |
| Se | 60.00 | 78.96 | 49.989 |
| S | 2.50 | 32.064 | 0.846 |
|  | 100.00 |  | ~80.000 |

The ampoule was placed in a two-zone furnace (FIG. 6) for the glass melting, homogenization, and distillation processes. The glass melting schedules are given in Step-1 in Table 7. When all the glass melt was distilled from chamber A to chamber B over during Soak Time 3 in Step-1 from Table 7 (FIG. 9), chamber B was pulled out of the furnace and quenched in water.

TABLE 7

Glass melting schedules for making 80 g of clad cullet with $Ge_{19.5}As_{18}S_{2.5}Se_{60}$ comp.

|  | Step-1 | | Step-2 |
| --- | --- | --- | --- |
|  | Zone 1 | Zone 2 | Zone 1 & 2 |
| Ramp 1 (° C./min) | 5 | 5 | 5 |
| Soak Temp 1 (° C.) | 500 | 550 | 850 |
| Soak Time 1 (hrs.) | 1 | 1 | 15 |
| Ramp 2 (° C./min) | 5 | 5 | 10 |
| Soak Temp 2 (° C.) | 850 | 900 | 650 |
| Soak Time 2 (hrs.) | 12 | 12 | 3 |
| Ramp 3 (° C./min) | 5 | 5 |  |
| Soak Temp 3 (° C.) | 900 | 400 |  |
| Soak Time 3 (hrs.) | 12 | 4-12 |  |
| Ramp 4 (° C./min) |  |  |  |
| Soak Temp 4 (° C.) |  |  |  |
| Soak Time 4 (hrs.) |  |  |  |
| Ramp 5 (° C./min) |  |  |  |
| Soak Temp 5 (° C.) |  |  |  |
| Soak Time 5 |  |  |  |

After chamber B was quenched, the ampoule was broken near the top and 0.0846 g of sulfur (S) was added to give a composition of $Ge_{19.5}As_{18}S_{2.5}Se_{60}$ to lower the refractive index of the chalcogenide glass. The ampoule containing the distilled glass and S was evacuated for 4 hours at $1\times10^{-5}$ Torr. The ampoule was sealed using a methane/oxygen torch. The ampoule was placed in a two-zone rocking furnace (FIG. 1) and was melted and homogenized using the schedule in Step-2 of Table 7. This melting was performed with the furnace rocking to mix and homogenize the glass. At the end of the melting cycle Soak Time 5 of 650° C., the rocking furnace was stopped and the glass ampoule was transferred into the vertical 90 degree furnace preheated to 750° C. Table 8 shows the glass melting schedules for the clad rod with $Ge_{19.5}As_{18}S_{2.5}Se_{60}$ composition.

TABLE 8

Glass melting schedules for the clad rod with $Ge_{19.5}As_{18}S_{2.5}Se_{60}$ composition.

|  | Step-6 |
| --- | --- |
| Ramp 1 (° C./min) | 5 |
| Soak Temp 1 (° C.) | 750 |
| Soak Time 1 (hrs.) | 3 |
| Ramp 2 (° C./min) | 5 |
| Soak Temp 2 (° C.) | 850 |
| Soak Time 2 (hrs.) | 1 |
| Ramp 3 (° C./min) | 5 |
| Soak Temp 3 (° C.) | 700 |
| Soak Time 3 (hrs.) | 1 |
| Ramp 4 (° C./min) | 2 |
| Soak Temp 4 (° C.) | 650 |
| Soak Time 4 (hrs.) | 1 |

The temperature of the vertical furnace was set at 850° C. for 1 hour for homogenization and uniform mixing. Next, the temperature of the vertical furnace was decreased slowly from 850° C. to 700° C. at 5° C./min, and held at 700° C. for 1 hour for equilibrium to occur. Then the temperature was decreased slowly from 700° C. to 650° C. at 2° C./min and held at 650° C. for 1 hour for equilibrium to occur. The quench temperature (650° C.) is higher than $T_{XC}$ to prevent crystallization of the glass melt before crystallization of the unstable glass can occur.

Next, the ampoule was raised above the vertical furnace and air quenched using the copper circular ring assembly (FIG. 9). First, the top of the glass melt near the meniscus was quenched using 60 psi of room temperature air. When the top of the glass melt has quenched and pulled away from the ampoule, the ampoule was slowly raised and air quenched sequentially until all sections of the glass rod completely quenched away from the ampoule. The Ge—As—S—Se glass ampoule was then put inside an annealer with a set point at 300° C. and was annealed at 300° C. for 4 hours and slowly cooled from 300° C. to room temperature at 1° C. /min. Similar to that of the core rod (FIG. 10), the clad rod obtained using the new process also has no refractive index perturbations and a considerably smaller meniscus compared to the conventional water quenched process.

The glasses of Examples 2 and 3 were drawn into optical fiber using a controlled double crucible process. The fibers were drawn under inert atmosphere at a rate of approximately 5.0 meters per minute. The fibers were free from refractive index perturbations when examined using optical microscopy. Single mode fibers should exhibit excellent qualities for making infrared fiber lasers.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A streamlined method of removing hydrogen impurities from chalcogenide glass components while forming a rare-earth doped chalcogenide glass comprising:
providing a first chamber disposed in a furnace;
providing all chalcogenide glass components in the first chamber in the presence of tellurium tetrachloride;
providing a second chamber disposed outside of the furnace fluidly connected to the first chamber such that vapors will transfer from the first chamber to the second chamber, wherein the second chamber is fluidly connected to a vacuum;
providing rare-earth elements in the second chamber wherein the rare-earth elements are in the second chamber when the chalcogenide glass components are in the first chamber;
heating the first chamber to a temperature to vaporize an HCl species from the chalcogenide glass components and withdrawing the HCl species from the first chamber via the vacuum;
after withdrawing the HCl species, distilling the chalcogenide glass components from the first chamber to the second chamber; and
heating and rocking the second chamber to form a rare-earth doped chalcogenide glass.

* * * * *